US012789847B2

(12) United States Patent
Dingli et al.

(10) Patent No.: US 12,789,847 B2
(45) Date of Patent: Nov. 10, 2026

(54) OFFBOARD INFRASTRUCTURE TO AUGMENT VEHICLE SYSTEMS

(71) Applicant: PlusAI, Inc., Santa Clara, CA (US)

(72) Inventors: Robert Joseph Dingli, Cupertino, CA (US); Timothy Patrick Daly, Jr., San Jose, CA (US); Shawn Kerrigan, Santa Clara, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/798,704

(22) Filed: Aug. 8, 2024

(65) Prior Publication Data

US 2025/0115280 A1 Apr. 10, 2025

Related U.S. Application Data

(60) Provisional application No. 63/544,098, filed on Oct. 13, 2023, provisional application No. 63/542,462, filed on Oct. 4, 2023.

(51) Int. Cl.

| | |
|---|---|
| ***B60W 60/00*** | (2020.01) |
| ***B60W 50/00*** | (2006.01) |
| ***G01C 21/30*** | (2006.01) |
| ***G06N 3/08*** | (2023.01) |

(52) U.S. Cl.

CPC .... *B60W 60/0015* (2020.02); *B60W 50/0097* (2013.01); *G01C 21/30* (2013.01); *G06N 3/08* (2013.01); *B60W 2420/403* (2013.01); *B60W 2420/408* (2024.01); *B60W 2554/4041* (2020.02); *B60W 2554/4042* (2020.02); *B60W 2554/4044* (2020.02)

(58) Field of Classification Search

CPC .................................................. B60W 2556/45

See application file for complete search history.

(56) References Cited

U.S. PATENT DOCUMENTS

2020/0047751 A1* 2/2020 Hwu .................... B60W 50/14
2021/0016796 A1* 1/2021 Matsushita .......... G05D 1/0027
2022/0126864 A1* 4/2022 Moustafa .......... B60W 60/0013
2022/0289252 A1* 9/2022 Liu .................. G08G 1/096783
2022/0388536 A1* 12/2022 Kothbauer ......... B60W 60/0011

(Continued)

FOREIGN PATENT DOCUMENTS

CN 116071711 A 5/2023
WO 2018122804 A1 7/2018

OTHER PUBLICATIONS

Shams, Hammad, “Google Maps Now has Live Traffic Alerts & Alternate Route Suggestions”, Linkedin.com 2015 (Year: 2015), 5 pages.

(Continued)

*Primary Examiner* — Anshul Sood
(74) *Attorney, Agent, or Firm* — Rimon PC

(57) ABSTRACT

Methods, systems, and non-transitory computer readable media are configured to perform operations comprising capturing, by a computing system, sensor data associated with a segment of a road, the computing system disposed on a structure associated with the road; detecting, by the computing system, objects in the segment of the road based on the sensor data; and providing, by the computing system, data associated with the detected objects to a vehicle travelling in the segment of the road.

20 Claims, 10 Drawing Sheets

(56) References Cited

U.S. PATENT DOCUMENTS

| | | | | |
|---|---|---|---|---|
| 2023/0095384 | A1* | 3/2023 | Sharma Banjade | G08G 1/096725 701/301 |
| 2023/0199449 | A1* | 6/2023 | Katta | H04W 4/44 370/310 |
| 2023/0360406 | A1 | 11/2023 | Yu et al. | |
| 2023/0394960 | A1 | 12/2023 | Symes et al. | |
| 2023/0409881 | A1 | 12/2023 | Heitzmann et al. | |

OTHER PUBLICATIONS

Examination Report Issued in Australia Patent Application No. 2024227124; Dated Mar. 20, 2026; pp. 1-4.

* cited by examiner

OFFBOARD INFRASTRUCTURE TO AUGMENT VEHICLE SYSTEMS

CROSS-REFERENCE TO RELATED APPLICATIONS

This application claims priority to U.S. Provisional Patent Application No. 63/542,462, filed on Oct. 4, 2023 and entitled "Infrastructure Off-Board Perception", and U.S. Provisional Patent Application No. 63/544,098, filed on Oct. 13, 2023 and entitled "Infrastructure Based Perception System", which are incorporated herein by reference in their entireties.

FIELD OF THE INVENTION

The present technology relates to vehicle systems. More particularly, the present technology relates to offboard infrastructure to augment onboard systems of a vehicle.

BACKGROUND

Vehicles can be operated at various levels of autonomy or assistance. The levels can span a range from modest driver assistance to fully automated navigation. Operation of vehicles at these levels is subject to various safety requirements. A vehicle can be required to manage a range of component and system failure modes with a sufficient level of robustness.

SUMMARY

Various embodiments of the present technology can include methods, systems, and non-transitory computer readable media configured to perform operations comprising capturing, by a computing system, sensor data associated with a segment of a road, the computing system disposed on a structure associated with the road; detecting, by the computing system, objects in the segment of the road based on the sensor data; and providing, by the computing system, data associated with the detected objects to a vehicle travelling in the segment of the road.

In some embodiments, the computing system is associated with an infrastructure system providing services to vehicles subscribed to the services and travelling on the road.

In some embodiments, the computing system is associated with an infrastructure unit dedicated to the segment of the road.

In some embodiments, the computing system is associated with an infrastructure unit comprising a sensor system and a computation system, the sensor system comprising at least one of a camera, radar, or LiDAR to capture the sensor data, and the computation system to detect the objects based on the sensor data.

In some embodiments, the data associated with the detected objects comprises attributes of the detected objects comprising at least one of a classification, position, heading, speed, and predicted behavior.

In some embodiments, the data associated with the detected objects is i) redundant to data generated by an onboard system of the vehicle and ii) allows the vehicle to perform a maneuver otherwise not authorized when the onboard system of the vehicle experiences a fault.

In some embodiments, an expansion of an operational design domain (ODD) of the vehicle is based on the data associated with the detected objects.

In some embodiments, the computing system is associated with a first infrastructure unit. The methods, systems, and non-transitory computer readable media are configured to perform further operations comprising receiving from a second infrastructure unit data relating to an event occurring in a second segment of the road, the second infrastructure unit i) included in a plurality of infrastructure units of an infrastructure system including the first infrastructure unit and ii) dedicated to the second segment of the road; and providing the data relating to the event to the vehicle.

In some embodiments, the methods, systems, and non-transitory computer readable media are configured to perform further operations comprising receiving from a central control room data relating to an event, the central control room associated with an infrastructure system including a plurality of infrastructure units including an infrastructure unit associated with the computing system, the data relating to the event obtained by the central control room from a third party source; and providing the data relating to the event to the vehicle.

In some embodiments, the computing system is associated with an infrastructure unit of an infrastructure system, the infrastructure unit comprising one or more types of sensors not present on the vehicle.

It should be appreciated that many other embodiments, features, applications, and variations of the present technology will be apparent from the following detailed description and from the accompanying drawings. Additional and alternative implementations of the methods, non-transitory computer readable media, systems, and structures described herein can be employed without departing from the principles of the present technology.

BRIEF DESCRIPTION OF THE DRAWINGS

The figures depict various embodiments of the present technology for purposes of illustration only, wherein the figures use like reference numerals to identify like elements.

Figure 1:
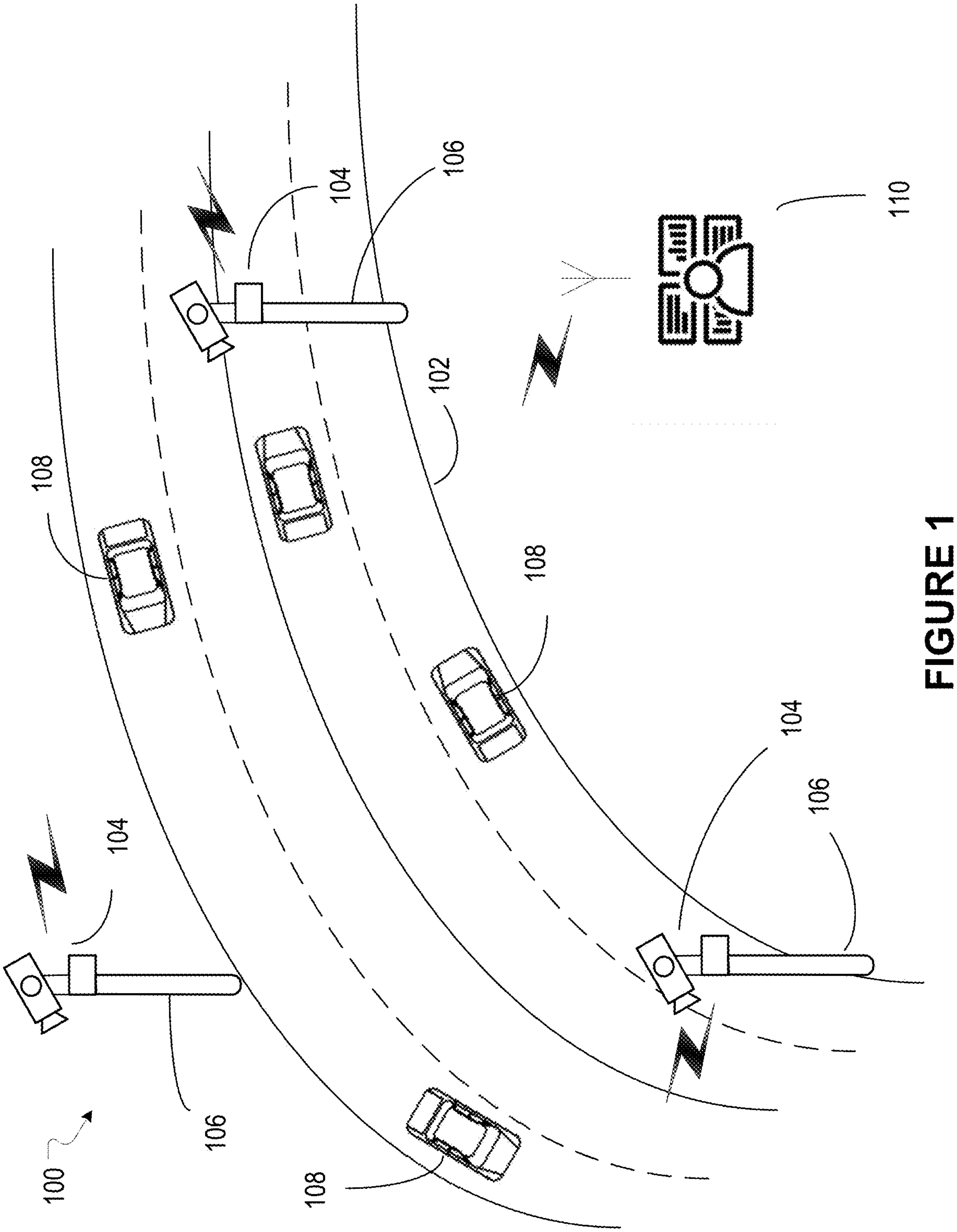
FIG. 1 illustrates an example infrastructure system deployed on a road, according to embodiments of the present technology.

One skilled in the art will readily recognize from the following discussion that alternative embodiments of the structures and methods illustrated in the figures can be employed without departing from the principles of the present technology described herein.

DETAILED DESCRIPTION

Vehicles can be operated at various levels of autonomy or assistance. The levels can span a range from modest driver assistance to fully automated navigation. Operation of vehicles at these levels is subject to various safety requirements. A vehicle can be required to manage a range of component and system failure modes with a sufficient level of robustness. International standards for functional safety of electronic systems installed in road vehicles, such as ISO 26262, can specify predefined thresholds or goals. For example, according to a best practice automotive industry functional safety process, a highest level of robustness for high exposure, high severity, safety critical hardware faults aims to target an Automotive Safety Integrity Level (ASIL) of ASIL-D. As part of a risk classification scheme defined by the ISO 26262, ASIL-D specifies a target failure in time (FIT) rate of 10, which equates to a target probability of less than 10 failures every 109 (one billion) hours of operation (approximately 110,000 years).

A robustness target, such as a FIT rate of 10, is extremely difficult to achieve, and generally requires use of redundant or complementary systems (or subsystems) that can demonstrate freedom from systematic or cascading faults. That is, a conventional solution often employs two or more systems that are intended to individually provide the required level of robustness. In a conventional solution, different systems should not fail due to a common root cause, and a failure in one system should not lead to a failure in the other system.

A conventional vehicle operable in an automated or autonomous mode of navigation can include sensing, computation, and actuation systems. A sensing system with a high level of robustness requires a primary sensing subsystem that is capable of providing a suitable level of performance for an intended application and a redundant backup sensing subsystem that is sufficient to avoid a hazardous situation (e.g., potential of harm to a person) in the event of a hardware fault in the primary sensing subsystem. Together, the primary sensing subsystem and the redundant backup sensing subsystem can contribute to reaching a desired ASIL level.

The redundant backup sensing subsystem should be capable of performing a desired Minimal Risk Maneuver (MRM) in response to a fault that could potentially lead to a hazardous situation. If a vehicle is designed to pull over to the side of the road as an MRM, then the redundant sensing subsystem should be suitable for performing the MRM. Performance of the MRM may involve or require extra sensors for the front, side, and rear of the vehicle. If stopping in lane is a sufficient MRM in response to a potentially hazardous situation, then the redundant sensing subsystem would require a more simple sensing capability. In some situations, depending on the Operational Design Domain (ODD) associated with the vehicle, a simple stop in lane as an MRM may not be sufficient. A fully redundant sensing subsystem designed to perform an appropriate MRM can add a significant amount of cost and complexity to a vehicle.

The present technology provides improved approaches for vehicle navigation that overcome the aforementioned and other technological disadvantages. In various embodiments, the present technology can leverage an offboard infrastructure system to optimize safe navigation of vehicles. The infrastructure system can be deployed for a road and provide services to vehicles on the road. The infrastructure system can include a plurality of infrastructure units positioned along or adjacent to the road. For example, an infrastructure unit can be disposed on or otherwise attached to a fixture (e.g., pole, tower) that is positioned on or around the road. An infrastructure unit can be dedicated to or otherwise associated with a corresponding segment of the road. Infrastructure units, or corresponding fixtures to which they are attached, can be separated by a predetermined distance or by variable distances along the road. Each infrastructure unit can include a sensor system and a computation system. The infrastructure unit can acquire sensor data capturing objects and events that appear within the fields of view of its sensor system. Based on the sensor data, the infrastructure unit can detect the objects and the events and determine attributes relating thereto. The infrastructure unit also can receive data about other objects and events from other infrastructure units or a corresponding central control room. Based on a suitable wireless communications network, infrastructure units can communicate with one another, to and from vehicles travelling on corresponding segments of the road, and to and from a corresponding central control room.

A vehicle subscribed to the infrastructure system can receive data from the infrastructure system to optimize safe and effective vehicle navigation. As the vehicle navigates along a segment of the road, an infrastructure unit corresponding to the segment can provide to the vehicle data relating to objects and events in the segment. For example, the data relating to objects can include classification, position, heading, speed, predicted behavior, and other attributes of objects. The infrastructure unit also can receive from other infrastructure units or a corresponding central control room, and provide to the vehicle, data relating to objects and events associated with other segments of the road as well events not relating to any particular segment of the road. In some instances, the other infrastructure units and the central control room can provide such data directly to the vehicle. Based on the provision of data to the vehicle, the infrastructure system can constitute an independent, auxiliary sensing, perception, and prediction system for the vehicle that augments or complements preexisting onboard sensing, perception, and prediction systems of the vehicle. In some instances, the infrastructure system can constitute for the vehicle an independent, auxiliary sensing and perception system in which predictive capabilities are optional. The infrastructure system in this manner can provide to the vehicle a required level of robustness to hardware faults through diverse redundancy.

Capture, detection, and provision of data by an infrastructure system to vehicles in accordance with the present technology can constitute diverse redundancy for the vehicles that pose myriad advantages. The number of infrastructure units that incorporate roadside sensing, perception and prediction systems can scale with the length and complexity of a road rather than the number of vehicles travelling on the road. Consequently, the present technology is more scalable and less costly than burdensome installation of redundant sensing, perception, and prediction systems in all vehicles because the cost for the infrastructure units can be shared by all vehicles that are subscribed to services provided by the infrastructure system. In addition, roadside sensing, perception, and prediction systems as provided by the infrastructure system can selectively employ more sensors or advanced sensors at critical locations along the road, as needed. As a result, vehicle based sensing, perception, and prediction systems no longer need to incur the significant burden and costs of accommodating all possible scenarios including those involving the critical locations. Further, roadway infrastructure can be continuously improved and advanced as new technology becomes available. A technology upgrade to an infrastructure system can then benefit all vehicles subscribed to the infrastructure system. Moreover, roadside sensing, perception, and prediction systems can employ better sensor solutions and computation systems due to lower constraints on size, packaging, and mechanical robustness as well as due to cost benefits of fixed infrastructure over expensive portable or mobile implementations required by vehicles. In addition, a roadside sensing, perception, and prediction system can be routinely maintained to a known high standard. Further, a roadside sensing, perception, and prediction system can itself have redundant elements to further bolster high confidence in data captured by the infrastructure system. These and other inventive features and related advantages of the various embodiments of the present technology are discussed in more detail herein.

FIG. 1 illustrates an example infrastructure system 100 associated with a road 102, according to some embodiments of the present technology. FIG. 1 is illustrated for purposes of explanation and is not drawn to scale. The infrastructure system 100 can monitor, control, or otherwise provide services for vehicles 108 on the road 102. The infrastructure system 100 can include infrastructure units 104, structures 106, and a central control room 110. The vehicles 108 can be subscribed to services offered by the infrastructure system 100. The services can include provision to the vehicles 108 of data facilitating safe and efficient navigation of the road 102. Through provision of the data, the infrastructure system 100 can constitute a diverse redundant offboard sensing, perception, and prediction system that can augment onboard sensing, perception, and prediction systems installed on the vehicles 108, such as a perception module 912, a localization module 914, and a prediction and planning module 916 of a system 910 of FIG. 9, as discussion in more detail herein. In some instances, the infrastructure system can constitute for the vehicles 108 an independent, auxiliary sensing and perception system having optional predictive capabilities. Accordingly, predictive determinations discussed herein are optional in various embodiments. The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the infrastructure system 100, the infrastructure units 104, or the central control room 110 can be implemented in or performed by any suitable combinations of the infrastructure system 100, the infrastructure units 104, and the central control room 110.

The vehicles 108 can be a portion or the entirety of all vehicles travelling or otherwise located on the road 102. The vehicles 108 can be any types of vehicles that are capable of subscribing to services provided by the infrastructure system 100. For example, a service provided by the infrastructure system 100 can include the provision of data to a vehicle to enhance safety and performance of the vehicle. The vehicles 108 can include passenger cars, vans, buses, trucks, motorcycles, mopeds, emergency vehicles, bicycles, scooters, and the like. The vehicles 108 can include vehicles operable at various levels of autonomy or assistance (e.g., autonomous vehicles) as well as vehicles that are fully manually driven without any level of autonomy or assistance. As referenced herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, based on the Society of Automotive Engineers (SAE) standard, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term “driver” may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

The road 102 can be a road of any type. The road 102 can be a street, roadway, expressway, highway, or a freeway in a metropolitan, urban, suburban, rural, or industrial environment. The road 102 can be of any length, such as 1 kilometer, 1 mile, 5 kilometers, 5 miles, 40 kilometers, 35 miles, etc. Portions of the road 102 can reflect any one or a combination of geometries, such as substantially straight, curved, windy, etc. Portions of the road 102 can be substantially flat, uphill, or downhill. The road 102 can support one way traffic or two way traffic. For each direction of traffic supported by the road 102, the road 102 can have any number of lanes, such as one lane, two lanes, three lanes, four lanes, five lanes, etc. The lanes of the road 102 can include, for example, basic lanes, carpool lanes, emergency lanes, merge lanes, on ramps, off ramps, etc. The road 102 can have a shoulder or other non-driving surface or section on each side of the road 102. The road 102 can have a middle divider or other section separating two directions of traffic.

The infrastructure units 104 can be affixed to or otherwise disposed on structures 106 positioned at various locations on or along the road 102. As discussed in more detail herein, an infrastructure unit 104 can include a sensor system and a computation system to capture and process data associated with a corresponding segment of the road 102. The infrastructure unit 104 also can receive data from other sources of the infrastructure system 100, as discussed in more detail herein. The sensor system of each infrastructure unit 104 can be oriented or directed toward the road 102 so that the field of view of the infrastructure unit 104 can encompass a corresponding segment of the road 102 associated with the infrastructure unit 104. The infrastructure units 104 can be separated or distributed along the road 102 so that the infrastructure units 104 can collectively and comprehensively monitor and capture data relating to the full extent of the road 102. In this regard, the infrastructure units 104 can be located along the road 102 so that no portion of the road 102 is not monitored by an infrastructure unit 104. In some embodiments, for a portion or entirety of the road 102, the infrastructure units 104 can be separated by a predetermined distance as measured, for example, longitudinally in relation to the geometry of the road 102. For example, when the road 102 is substantially straight, the infrastructure units 104 can be separated by a uniform or constant distance. The distance can be any suitable value (e.g., 100, meters, 250 meters, 500 meters, 1 kilometer, etc.). In some instances, for a portion or entirety of the road 102, the infrastructure units 104 can be separated by smaller or variable distances to ensure adequate capture of data to account for special considerations. For example, if occlusions or obstructions (e.g., trees, bridges, overpasses, billboards, signs, etc.) on or near a portion of the road 102 interfere with or otherwise limit the field of view of an infrastructure unit 104, a larger number or density of infrastructure units 104 can be deployed at the portion of the road 102 in comparison to other portions of the road 102 to ensure adequate data capture for the portion of the road 102. As another example, if a portion of the road 102 is associated with a higher level of risk (e.g., intersections, on ramps, winding roadway, blind curves, etc.), a larger number or density of infrastructure units 104 can be deployed at the portion of the road 102 in comparison to other portions of the road 102 to capture more data and potentially reduce risk. As yet another example, if a portion of the road 102 is windy or curved to a significant degree, a larger number or density of infrastructure units 104 can be deployed at the portion of the road 102 in comparison to other portions of the road 102 to account for road geometry. In some embodiments, relatively higher performance sensor systems can be utilized in infrastructure units 104 associated with some portions of the road 102 while relatively lower performance sensor systems can be utilized in infrastructure units 104 associated with other portions of the road 102. For example, the relatively higher performance sensor systems can be utilized in portions of the road 102 that pose elevated risk.

The structures 106 can carry or support the infrastructure units 104. The structures 106 can be situated along or near the road 102 to achieve desired distribution distances between infrastructure units 104. The structures 106 can be positioned on or in proximity to the road 102 through a variety of manners. For example, the structures 106 can be secured to or in the road 102 or the ground adjacent to the road 102, such as on road shoulders or a middle divider. As another example, the structures 106 can be disposed on preexisting structures or other assemblies (e.g., signs, posts, etc.) along the road 102. The structures 106 can embody any configuration or shape suitable to carry or support the infrastructure units 104. For example, the structures 106 can be substantially straight or curved. A structure 106 can include or be attached to mounts, platforms, or other supports on which to dispose an infrastructure unit 104. An infrastructure unit 104 can be attached to a structure 106 at any suitable height (e.g., 10 meters, 20 meters, 25 meters, etc.) to optimize full capture of data reflecting all objects and events on a segment of the road 102 associated with the infrastructure unit 104. The fixed, stationary position of the infrastructure unit 104 on the structure 106 can enable the capture of data relating to the segment of the road 102 that is more accurate and reliable than the capture of data by moving sensors disposed on a vehicle travelling in the segment. In addition, the bird's eye perspective or orientation of the infrastructure unit 104 can enable the capture of data relating to the segment of the road that is not capable of being captured by sensors disposed on a vehicle travelling in the segment. In some embodiments, the infrastructure units 104 can be positioned on structures 106 at different heights or with different orientations from one another to account for special features or variations along the road 102, account for different capabilities of different sensor systems in the infrastructure units 104, and otherwise optimize data capture relating to the road 102.

The central control room 110 can be associated with the road 102 or a portion of the road 102. The central control room 110 can function as a control hub where transportation professionals manage safety and traffic in relation to the road 102. The central control room 110 can be a location (or locations) that is separate or remote from the road 102. The central control room 110 can contain various resources, such as human operators, communications equipment, and computing resources, to monitor, analyze, and predict conditions on the road 102. As discussed in more detail herein, the central control room 110, the vehicles 108, and the infrastructure units 104 can communicate with one another to optimize vehicle navigation along the road 102.

Figure 2:
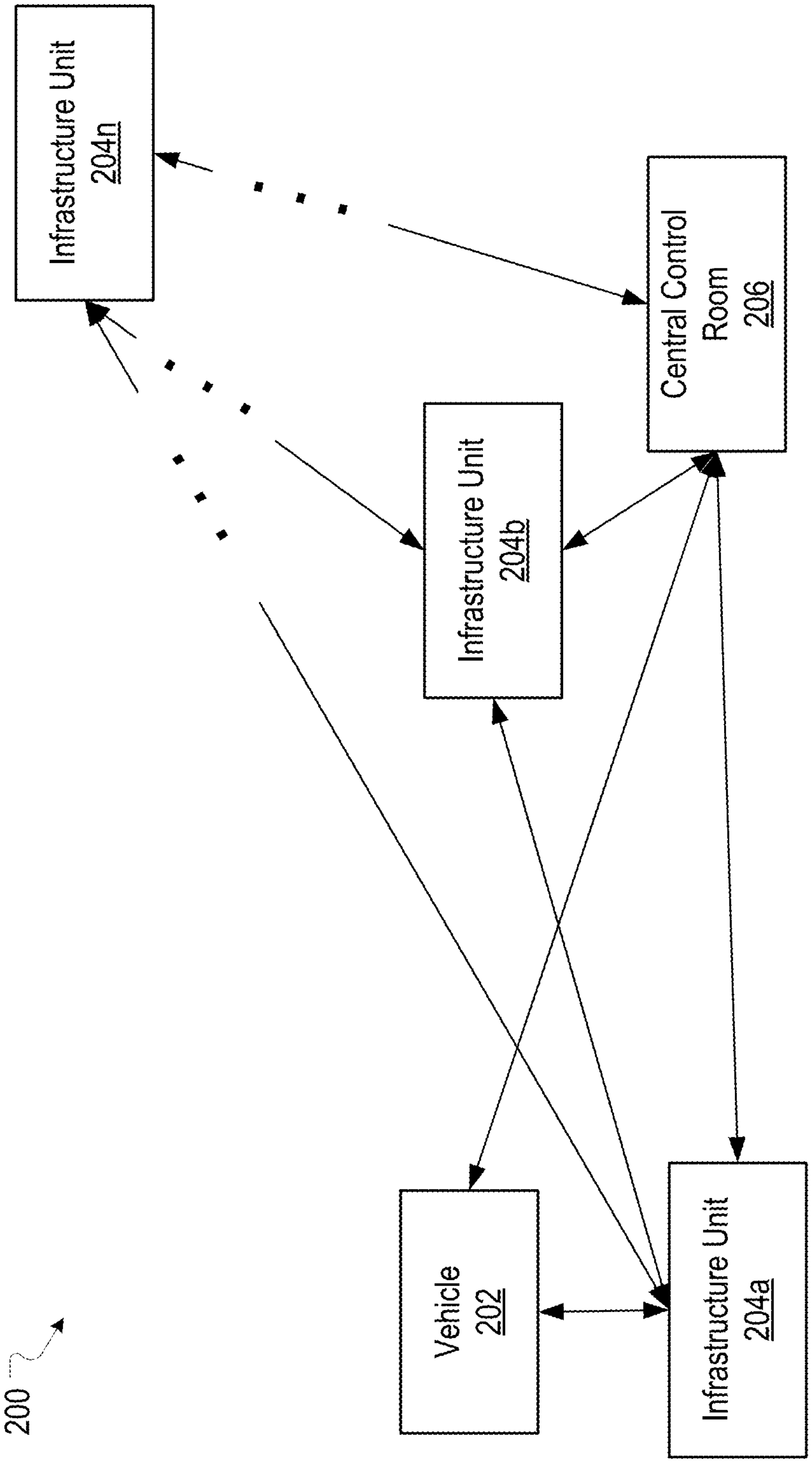
FIG. 2 illustrates an example simplified functional block diagram of communications associated with an infrastructure system, according to embodiments of the present technology.

FIG. 2 illustrates an example simplified functional block diagram of communications associated with an infrastructure system 200, according to some embodiments of the present technology. In some embodiments, the infrastructure system 200 can be an implementation of the infrastructure system 100. The infrastructure system 200 can utilize a communications network to support communications with vehicles. For purposes of illustration, a vehicle 202, infrastructure units 204*a-n*, and a central control room 206 are associated with a road or portion thereof. Although not shown to better illustrate features of the present technology, the infrastructure system can include other infrastructure units and other central control rooms and the road can include other vehicles.

The infrastructure unit 204*a* can communicate with the vehicle 202. The infrastructure unit 204*a* is associated with a segment of the road in which the vehicle 202 is currently positioned. The infrastructure unit 204*a* can include a sensor system that captures sensor data about objects and events that are present or occurring on or near the segment of the road. As discussed in more detail herein, the infrastructure unit 204*a* can detect objects on or adjacent to the segment of the road, determine various attributes regarding the objects, and predict behavior of the objects. In addition, the infrastructure unit 204*a* can detect or predict the occurrence of events or scenarios on or associated with the segment of the road. In addition, as discussed in more detail herein, the infrastructure unit 204*a* can receive similar or other types of data from other infrastructure units or the central control room 206. The infrastructure unit 204*a* can provide various types of data, including the data regarding the objects, events, and scenarios and the data from other infrastructure units and the central control room, in real time (or near real time) to the vehicle 202 and other vehicles in the segment. The infrastructure unit 204*a* can provide the data at one or more suitable frequencies (e.g., five times per second, ten times per second, 100 times per second, etc.). As discussed in more detail herein, the data provided by the infrastructure unit 204*a* to the vehicle 202 can augment data generated by one or more preexisting onboard systems of the vehicle 202 to enhance the safety and performance of the vehicle 202. In some embodiments, the vehicle 202 can provide to the infrastructure unit 204*a* data generated or determined by an onboard sensing, perception, and prediction system of the vehicle 202, and the infrastructure unit 204*a* can provide the data to other vehicles in the segment, other infrastructure units, or the central control room 206.

In some embodiments, the vehicle 202 can communicate with additional infrastructure units that are not associated with the segment of the road in which the vehicle 202 is positioned. For example, when communication between the vehicle 202 and the infrastructure system 200 is desired, the vehicle 202 can be directed to communicate with the infrastructure unit 204*a* associated with a segment of the road on which the vehicle 202 is travelling. In some instances, if the infrastructure unit 204*a* associated with the segment of the road on which the vehicle 202 is travelling is unable to conduct communications with the vehicle 202, another infrastructure unit associated with another segment of the road or another infrastructure unit that is closest to the vehicle 202 can conduct communications with the vehicle 202.

The infrastructure units 204*a-n* can communicate with one another. In some embodiments, as shown, each infrastructure unit 204 can communicate with all of the other infrastructure units 204*a-n* supporting the infrastructure system 200. In some embodiments, an infrastructure unit 204 can communicate with a portion of all other infrastructure units 204*a-n* supporting the infrastructure system 200. For instance, based on predetermined rules, the infrastructure unit 204*a* can communicate only with other infrastructure units that are positioned within a threshold distance (e.g., transmission range of the infrastructure unit 204*a*) from the infrastructure unit 204*a*. In another instance, the infrastructure unit 204*a* can communicate with a predetermined number (e.g., 2) of other infrastructure units that are positioned nearest to the infrastructure unit 204*a*. The infrastructure unit 204*a* can communicate with other infrastructure units to provide data informing the other infrastructure units about detected objects and detected events associated with the corresponding segment of the road that may impact navigation in segments of the road corresponding to the other infrastructure units. Upon receipt of the data, the other infrastructure units, in turn, can convey the data to vehicles located within associated segments of the other infrastructure units so that the vehicles can take appropriate proactive navigation measures in response to the objects and events.

The central control room 206 can communicate with the infrastructure units 204*a-n* and the vehicle 202. In some embodiments, the infrastructure system 200 can include one central control hub, and the central control room 206 can function as the central control hub for all of the infrastructure units associated with the entirety of a road. In some embodiments, the infrastructure system 200 can include a plurality of central control hubs, and the central control room 206 can function as a central control hub for infrastructure units associated with a portion of a road.

The central control room 206 can acquire various types of data. The acquired data can include information provided by the infrastructure units 204*a-n* and the vehicles on the road, including the vehicle 202. The acquired data also can include information from other central control rooms associated with other portions of the road or other roads. The acquired data also can include information from third party sources and databases. The third party sources and databases can include weather services, news outlets, road services, emergency response organizations, governmental agencies, and the like that are accessible through, for example, APIs that support communications feeds. Based on the acquired data, the central control room 206 can determine various types of data relevant to road navigation and provide (directly or indirectly) the data to the infrastructure units 204*a-n* and to the vehicles on the road that are subscribed to the infrastructure system 200, including the vehicle 202. The types of data determined by the central control room 206 can include data that has been generated by resources of the central control room 206. The resources can include, for example, human operators, transportation analysts, computing systems, artificial intelligence and machine learning models, and the like. The data determined by the central control room 206 can include, for example, navigation advice or information for vehicles on the road. The navigation advice or information can include, for example, indications about current or upcoming hazards (e.g., accidents, debris, persons, animals, road curves, malfunctioning infrastructure units, occluded or damaged road signage, etc.); alerts about emergency events (e.g., approaching emergency vehicles); suggestions to speed up, slow down, change lanes, exit, etc.; information about lane availability; information about alternate routes; warnings relating to road works, construction zones, lane or road closures, weather events (e.g., rain, snow, hail, etc.); and the like. In some embodiments, data determined by the central control room 206 can be selectively provided to all of the infrastructure units 204*a-n* or a subset of the infrastructure units 204*a-n*. In some embodiments, data determined by the central control room 206 can be selectively provided to all of the vehicles on a road (or portion thereof) associated with the central control room 206 or a subset of the vehicles. For example, if the central control room 206 determines that an emergency vehicle will imminently traverse the entirety of the road, the central control room 206 can provide an alert about the imminent presence of the emergency vehicle to all of the infrastructure units 204*a-n* because vehicle navigation and road conditions along all of the segments of the road can be impacted by the emergency vehicle. In this example, the infrastructure units 204*a-n*, in turn, can provide the alert to the vehicles positioned in the corresponding segments. Alternatively, the central control room 206 can provide alerts directly to the vehicles subscribed to the infrastructure system 200. As another example, if the central control room 206 determines that an emergency vehicle will imminently travel along only a portion of the road, the central control room 206 can provide an alert about the imminent presence of the emergency vehicle to only a subset of the infrastructure units 204*a-n* associated with segments of the road included in the portion to be travelled by the emergency vehicle. As yet another example, if the central control room 206 desires to provide a notification to only a particular vehicle, the central control room 206 can provide a notification to an infrastructure unit associated with a segment of the road in which the vehicle is located, and the infrastructure unit in turn can provide the notification to the vehicle. If the central control room 206 desires to provide a notification to only a particular vehicle, the central control room 206 alternatively can provide a direct notification to the vehicle without involving the associated infrastructure unit. The foregoing are merely illustrations and many variations are possible. In some embodiments, the central control room 206 can communicate data to other central control rooms of the infrastructure system 200 or other entities separate from the infrastructure system 200 (e.g., public safety authorities, governmental bodies, members of the public, subscribers of the infrastructure system, etc.) to apprise the other central control rooms or entities about real time road conditions.

A communications network supported by the infrastructure system 200 to enable communications among the vehicle 202, the infrastructure units 204*a-n*, and the central control room 206 can be implemented or supported in a variety of manners. In some embodiments, the communications network can support wireless communications among the vehicle 202, the infrastructure units 204*a-n*, and the central control room 206. In some embodiments, a communications network can support wireless communications between the vehicle 202 and the infrastructure units 204*a-n* and between the vehicle 202 and the central control room 206. In some embodiments, a communications network can support wireless or wired communications between the infrastructure units 204*a-n* and the central control room 206. In some embodiments, a latency requirement can be determined for the infrastructure system 200 that enables timely communications supportive of enhanced vehicle safety and performance along the road. The infrastructure system 200 can adopt a communications network that implements one or more selected communications protocols that satisfy the latency requirement. The latency requirement can be based in part on the amount of time within which detected objects and detected events relating to the road must be timely communicated to infrastructure units 204*a-n* and vehicles so that the vehicles can take safe, efficient, and otherwise appropriate action in response to the objects and the events. Selection of the communications protocol can depend on various attributes of the communications protocol, such as data transfer rate, range, power consumption, cost, robustness, functional safety, and security. In some instances, the infrastructure system 200 can support a communications network that implements a communications protocol for all communications in the infrastructure system 200 or different communications protocols based on the types of communicating entities, such as communications between an infrastructure unit and a vehicle versus communications between an infrastructure unit and the central control room. In some instances, the infrastructure system 200 can support a communications network that implements Wi-Fi or other type of communications protocol or standard (e.g., Bluetooth, Li-Fi, etc.).

The design and operation of the vehicle 202, the infrastructure units 204*a-n*, and the central control room 206 in the infrastructure system 200 have been provided for purposes of illustration. The design and operation of other vehicles, other infrastructure units, and other central control rooms can be as described for the vehicle 202, the infrastructure units 204*a-n*, and the central control room 206. For example, the design and operation of the infrastructure unit 204*a* as described can apply to each of the other infrastructure units 204*b-n*.

Figure 3:
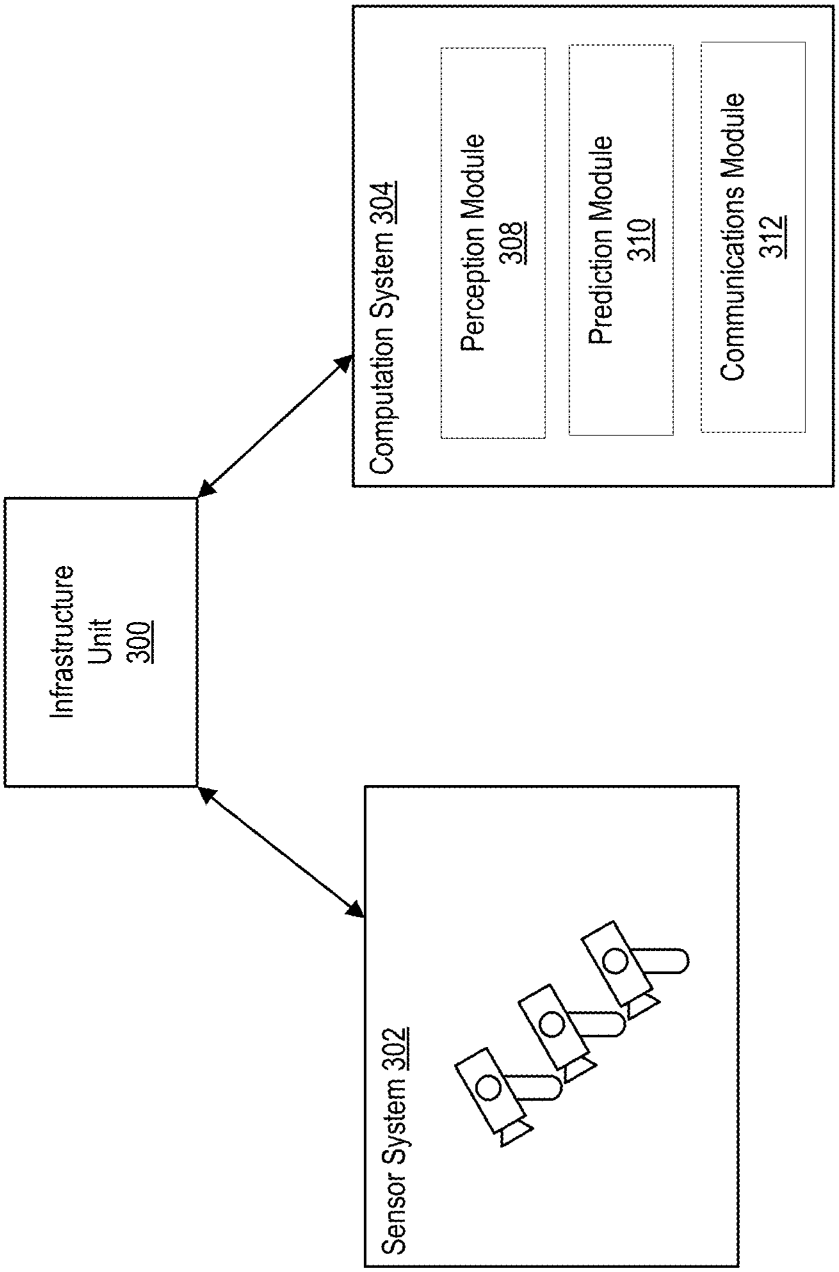
FIG. 3 illustrates an example simplified functional block diagram of an infrastructure unit associated with an infrastructure system, according to embodiments of the present technology.

FIG. 3 illustrates an example simplified functional block diagram of an infrastructure unit 300 associated with an infrastructure system, according to some embodiments of the present technology. In some embodiments, the infrastructure unit 300 can be utilized in the infrastructure system 100 (and the infrastructure system 200). The infrastructure unit 300 can be associated with a segment of a road serviced by the infrastructure system 100. The infrastructure unit 300 can include a sensor system 302 and a computation system 304 that function in real time (or near real time). In some embodiments, the sensor system 302 and the computation system 304 can include or be separate modular devices that are physically or communicatively connected or coupled with one another. In some instances, the sensor system 302 and the computation system 304 can be integrated as a single device constituting the infrastructure unit 300. In some embodiments, the sensor system 302 and the computation system 304 can be dedicated to the infrastructure unit 300. In some embodiments, the sensor system 302 or the computation system 304, or both, can be shared between the infrastructure unit 300 and one or more other infrastructure units (not shown). For purposes of illustration, the design and operation of the infrastructure unit 300 is set forth herein as an example. The design and operation of other infrastructure units in the infrastructure system 100 can be similar to the design and operation of the infrastructure unit 300.

The sensor system 302 can capture sensor data regarding a road, or an associated segment thereof, and its surroundings. Sensors of the sensor system 302 can be oriented or otherwise directed to have a field of view or other sensory scope to monitor an environment (e.g., area, space) in which the segment of the road associated with the infrastructure unit 300 is included. The environment monitored by the sensor system 302 can include the segment of the road associated with the infrastructure unit 300 as well as a selected amount of area or space above, around, and below the segment. In some embodiments, the environment associated with the segment and monitored by the sensor system 302 can overlap a selected amount with an environment associated with an adjoining segment and monitored by a sensor system of another infrastructure unit that is not the infrastructure unit 300. The sensor system 302 can include any types of sensors suitable for capturing sensor data about the environment associated with the segment corresponding to the infrastructure unit 300. The sensors in the sensor system 302 can include any numbers, combinations, and types of cameras, radar, LiDAR, or other types of sensors. For example, the cameras can include cameras with various focal lengths and resolutions; mono (monocular) cameras and stereo (stereoscopic) camera pairs; and infrared cameras. Likewise, the sensor system 302 can include various types of radar (e.g., short range, medium range, long range, continuous wave, pulse, etc.) and LiDAR (e.g., mechanical scanning, solid state, 2D, 3D, 4D, etc.). In some instances, the sensor system 302 and the computation system 304, or components thereof, are not utilized by or installed on the vehicles travelling on the road. For example, the sensor system 302 and the computation system 304 can include types of sensor technologies or computing components that will be developed in the future that are newer, more advanced than sensor technologies or computing components in vehicles. As newer, more advanced types of sensors and computation systems are developed, they can be advantageously incorporated by the infrastructure system 100 and included in the infrastructure unit 300 in contrast to onboard sensor systems installed in vehicles that can be limited to only the preexisting (old) types of sensors and computation systems with which the vehicles were manufactured. Accordingly, as discussed in more detail herein, the infrastructure system 100 can provide or constitute a diverse redundant sensing, perception, and prediction system for vehicles on the road that is superior to onboard systems installed on the vehicles themselves.

The computation system 304 can perform various operations based on the sensor data captured by the sensor system 302. The computation system 304 can include a perception module 308, a prediction module 310, and a communications module 312. Based on the sensor data, the perception module 308 can detect objects in an environment associated with a corresponding segment of a road. In addition, the perception module 308 can detect the occurrence of events or scenarios in the environment. Objects can include vehicles as well as any other types of obstacles. Vehicles can include any type of vehicle, including vehicles that are subscribed to services provided by the infrastructure system as well as vehicles not so subscribed. Obstacles can include, for example, obstructions, hazards, debris, persons, animals, road works, construction zones, signs, etc. Events can include accidents, traffic flow, lane or road closures, weather events (e.g., rain, snow, hail, wind, etc.), emergency events (e.g., emergency vehicle presence), malfunctioning road lights, and the like.

In some embodiments, the perception module 308 can detect objects and events based on various computer vision or machine learning techniques. For example, a machine learning model can be trained to detect objects and events based on sensor data. The machine learning model can be trained with training data that includes instances of sensor data representing various objects and events. The sensor data can include, for example, labels (e.g., class labels) that identify or classify objects and events in the sensor data. The sensor data can be annotated to indicate locations (e.g., xy coordinates, bounding boxes) or pixel positions of objects and events in the sensor data. Based on the training data, the machine learning model can be trained to detect objects and events in sensor data and label the objects and the events with appropriate classifications (e.g., vehicle type classifications). In addition, the machine learning model can be trained to generate, for example, bounding boxes to indicate locations of the objects and the events in the sensor data.

Based on the sensor data, the perception module 308 can generate various types of perception data. For example, perception data can include identifications, or classifications, of objects and events. In addition, the perception data can include values relating to, as applicable, the position, heading (direction), speed, and other attributes of objects represented in the sensor data. The values determined by the perception module 308 can be absolute values or relative values. For example, the position of objects can be provided by the perception module 308 as absolute position data (e.g., GPS coordinates). In other examples, the position of the objects can be determined by the perception module 308 as relative position data, such as location data that is specified in relation to a predetermined object (or marker) or coordinate system. In some embodiments, any personally identifiable information can be removed from or obscured in the perception data to protect data privacy or otherwise comply with related data privacy regulations.

Based on perception data provided by the perception module 308, the prediction module 310 can generate various types of prediction data. The prediction data can relate to a state or behavior of an object. The prediction module 310 can determine as prediction data future values of an attribute associated with the object, including, for example, position, heading, speed, acceleration, and the like. For example, based on past or current movement of an object such as a vehicle, the prediction module 310 can predict a value of acceleration or braking of the vehicle at a certain location or time along with a confidence level associated with the prediction. As another example, based on a path already travelled by an object such as a vehicle, the prediction module 310 can generate data indicating a likelihood that the vehicle will perform a lane change and the location of the vehicle at various times during the lane change. Many examples are possible. In some embodiments, the prediction module 310 can utilize one or more machine learning models (e.g., RNNs). For example, a machine learning model can be trained with features relating to past or current values of attributes associated with objects along with labels indicating future values of the attributes. Once trained, the machine learning model in production can be provided with past or current values of an attribute of an object and can predict a future value of the attribute.

The communications module 312 can provide in real time (or near real time) infrastructure data to vehicles that are travelling along an associated segment of a road and that are subscribed to services provided by the infrastructure system 100. The infrastructure data can include perception data generated by the perception module 308 and prediction data generated by the prediction module 310. The perception data and the prediction data can include any types of data relating to the actual or predicted presence or occurrence of objects and events that could potentially impact navigation of vehicles travelling in the segment. In some embodiments, the perception data and the prediction data can include, for example, a listing or identification of all objects in the segment of the road, as well as a classification, position, heading, speed, and predicted state or behavior of each object. In some embodiments, the perception data and the prediction data also can include lane availability data. The perception data and the prediction data can be received and utilized by the vehicles to enhance the ability of the vehicles to safely and effectively navigate the segment of the road. For example, the perception data and the prediction data can be utilized by a vehicle to determine or confirm the position of the vehicle (or localization) and objects in proximity to the vehicle. In some embodiments, the perception data and the prediction data can be provided to a corresponding central control room to allow the central control room to understand and monitor conditions of the segment. The infrastructure data also can include data received by the infrastructure unit 300 from other infrastructure units or from a central control room, as discussed in more detail herein.

Figure 4:
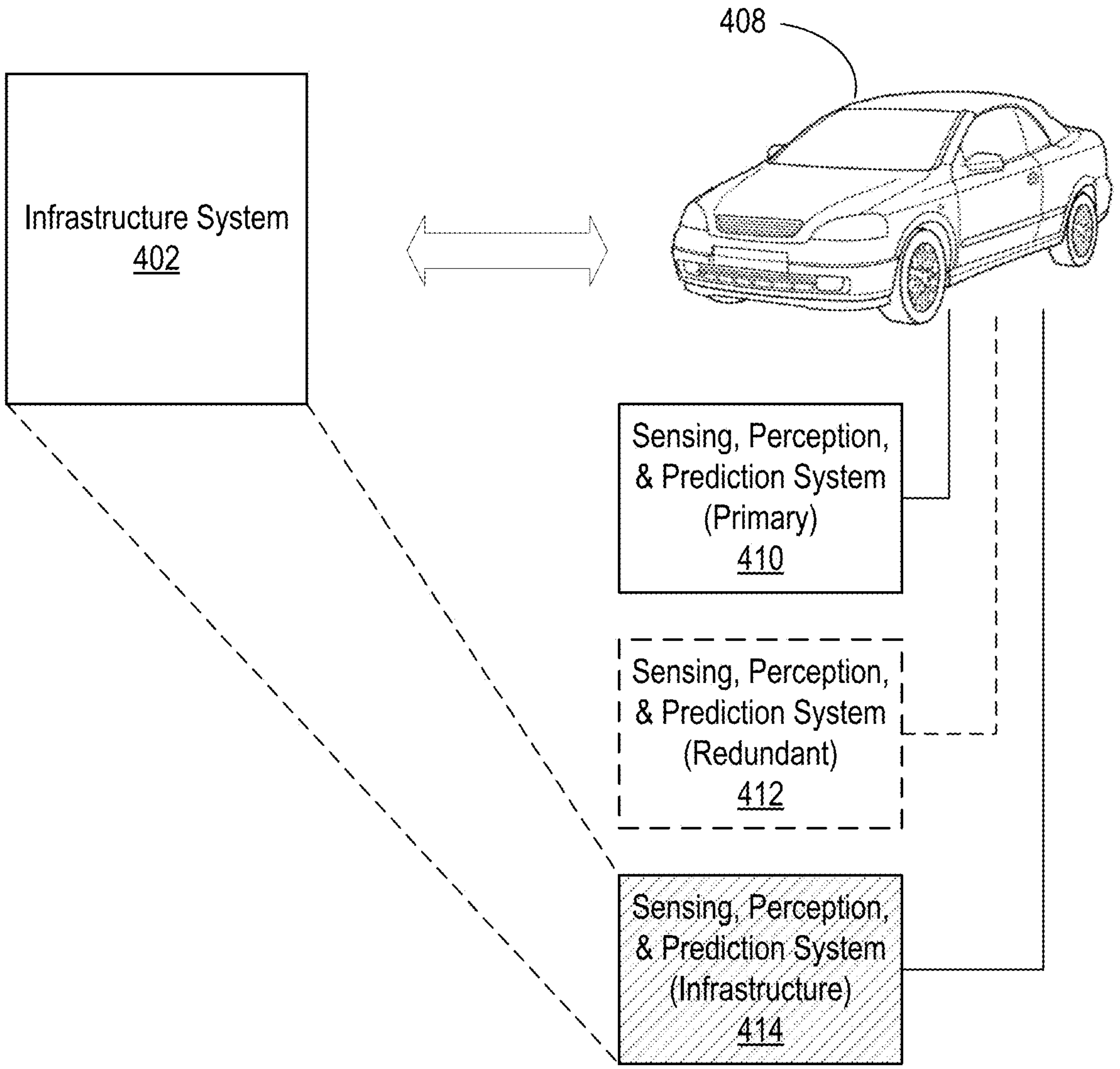
FIG. 4 illustrates an example simplified functional block diagram of an infrastructure system to augment vehicle capabilities, according to embodiments of the present technology.

FIG. 4 illustrates an example simplified functional block diagram of an infrastructure system 402 to augment vehicle capabilities, according to some embodiments of the present technology. A vehicle 408 that is travelling on a road serviced by the infrastructure system 402 can include an onboard sensing, perception, and prediction system 410 that is primary. In some embodiments, the vehicle 408 can include an onboard sensing, perception, and prediction system 412 that is secondary or redundant. The infrastructure system 402 can include an offboard sensing, perception, and prediction system 414 that can be implemented by the infrastructure unit 300. The offboard sensing, perception, and prediction system 414 can be utilized for the vehicle 408 to augment the onboard sensing, perception, and prediction system 410 and, when present, the onboard sensing, perception, and prediction system 412. In particular, the infrastructure system 402 can provide to the vehicle 408 infrastructure data, including perception data and prediction data generated by the offboard sensing, perception, and prediction system 414. The perception data and the prediction data generated by the infrastructure system 402 and provided to the vehicle 408 can supplement or augment the data generated by the onboard sensing, perception, and prediction system 410 and, when present, the onboard sensing, perception, and prediction system 412 to enhance robustness of the vehicle 408. The perception data and the prediction data generated by the infrastructure system 402 can increase a level of understanding of the vehicle 408 of the environment associated with a road or segment thereof. Accordingly, the perception data and the prediction data generated by the infrastructure system 402 can support improvements to the safety and performance of the vehicle 408. For example, based on the data relating to objects on the road and their attributes as well as lane or roadway availability, the vehicle 408 can determine a safest course of action to bring the vehicle 408 to a safe state in the event of a fault.

In some embodiments, the offboard sensing, perception, and prediction system 414 of the infrastructure system 402 can augment the capabilities of the vehicle 408 when the vehicle 408 has only the onboard sensing, perception, and prediction system 410. For example, assume the vehicle 408 can operate in an autonomous mode of navigation (e.g., Level 3). Assume further that, according to an ODD associated with the vehicle 408, the vehicle 408 can travel up to a predetermined top speed value on a road, such as a highway, without manual intervention by a human. The predetermined top speed value can be determined based in part on safety considerations that account for limitations of the onboard sensing, perception, and prediction system 410. However, based on the perception data and the prediction data provided by the offboard sensing, perception, and prediction system 414, the vehicle 408 can have a more expansive, more accurate understanding of the environment. The improved understanding of the environment can permit a safe increase in the top speed value of the vehicle 408 as it travels on the highway. In this manner, the infrastructure system 402 has effectively expanded (or enhanced) the ODD of the vehicle 408.

In some embodiments, the offboard sensing, perception, and prediction system 414 of the infrastructure system 402 can augment the capabilities of the vehicle 408 when the vehicle 408 has both the onboard sensing, perception, and prediction system 410 and the onboard sensing, perception, and prediction system 412. For example, assume that the onboard sensing, perception, and prediction system 410 has become non-operational. For example, the sensors of the onboard sensing, perception, and prediction system 410 can malfunction or, despite properly functioning, can be occluded by debris. Because the vehicle 408 is operating with only the onboard sensing, perception, and prediction system 412 as a backup, the vehicle 408 could perform an MRM, such as an immediate stop, based on safety constraints applicable to situations when the vehicle 408 loses diverse redundancy. However, based on the perception data and the prediction data provided to the vehicle 408, the offboard sensing, perception, and prediction system 414 can serve as diverse redundant capability to complement the onboard sensing, perception, and prediction system 412. As a result, the vehicle 408 need not immediately stop. Rather, in this example, the vehicle 408 can travel to an interim safe location that poses less risk than an immediate stop or potentially travel to its original destination.

In some embodiments, the offboard sensing, perception, and prediction system 414 of the infrastructure system 402 can augment the capabilities of the vehicle 408 in different manners when the vehicle 408 has both the onboard sensing, perception, and prediction system 410 and the onboard sensing, perception, and prediction system 412. For example, assume that a fault has rendered non-operational both the onboard sensing, perception, and prediction system 410 and the onboard sensing, perception, and prediction system 412. For example, as referenced, the fault can be a malfunction or obstruction of sensors of the onboard sensing, perception, and prediction system 410 and the onboard sensing, perception, and prediction system 412. In this situation, the vehicle 408 can be brought to an immediate stop. However, the offboard sensing, perception, and prediction system 414 can provide perception data and prediction data to the vehicle 408. Accordingly, instead of performing an immediate stop that could pose risk, the vehicle 408 can rely on the perception data and the prediction data provided by the offboard sensing, perception, and prediction system 414 to perform a safer maneuver, such as slowing down to pull over to a shoulder.

In addition to supporting the performance of MRMs by the vehicle 408, the perception data and the prediction data provided to the vehicle 408 can be utilized to perform a health check of the vehicle 408. From the offboard sensing, perception, and prediction system 414, the vehicle 408 can receive information relating to, for example, objects including the vehicle 408, attributes of the objects, and freespace and drivable road surface of the segment of the road. The onboard sensing, perception, and prediction system 410 (or the onboard sensing, perception, and prediction system 412) of the vehicle 408 can independently perform the same detections and determinations. Comparison of the results of the onboard sensing, perception, and prediction system 410 (or the onboard sensing, perception, and prediction system 412) with the offboard sensing, perception, and prediction system 414 can indicate proper or faulty function. For example, if a result from the onboard sensing, perception, and prediction system 410 is the same as the result from the offboard sensing, perception, and prediction system 414, the vehicle 408 can determine that the onboard sensing, perception, and prediction system 410 is operating normally with a relatively high level of confidence. As another example, if a result from the onboard sensing, perception, and prediction system 410 is not the same (by at least a threshold difference amount) as the result from the offboard sensing, perception, and prediction system 414, the vehicle 408 can be unable to determine that the onboard sensing, perception, and prediction system 410 is operating normally with a relatively high level of confidence. Accordingly, the vehicle 408, for example, can dismiss the result (and other results) generated by the onboard sensing, perception, and prediction system 410 in motion planning or initiate measures to further test or troubleshoot the onboard sensing, perception, and prediction system 410. As yet another example, if a result from the onboard sensing, perception, and prediction system 410 is the same as a result from the onboard sensing, perception, and prediction system 412, but that result is different (by at least a threshold difference amount) from the result from the offboard sensing, perception, and prediction system 414, the vehicle 408 can determine that the offboard sensing, perception, and prediction system 414 is not operating normally and accordingly dismiss the result from the offboard sensing, perception, and prediction system 414 from navigation planning. Many variations are possible.

Figure 5:
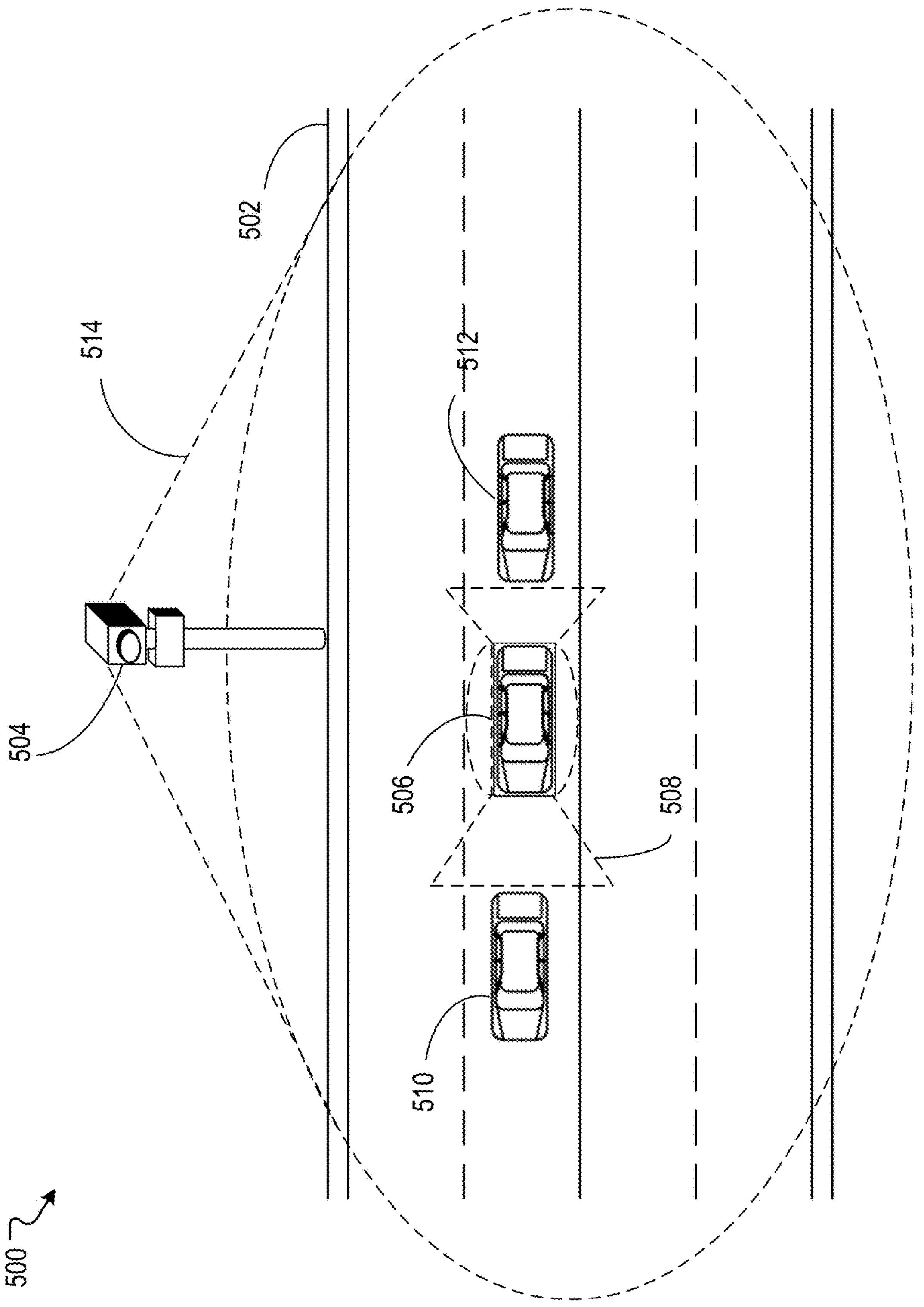
FIG. 5 illustrates data captured by an infrastructure system, according to embodiments of the present technology.

FIG. 5 illustrates data capture by an infrastructure system 500, according to some embodiments of the present technology. FIG. 5 is illustrated for purposes of explanation and is not drawn to scale. The infrastructure system 500 can be deployed for a road having a segment 502 monitored by a dedicated infrastructure unit 504. A vehicle 506 subscribed to the infrastructure system 500 is travelling on the segment 502. Based on one or more onboard sensing, perception, and prediction systems, the vehicle 506 can have a field of view 508 of an environment from which the vehicle 506 can capture sensor data. As shown, the field of view 508 of the vehicle 506 is limited by a vehicle 510 in front of the vehicle 506 and by a vehicle 512 in back of the vehicle 506. The field of view 508 constrains the ability of the vehicle 506 to understand the environment and thus decreases the safety and performance of the vehicle 506 as it travels on the segment 502.

Compared to the vehicle 506, the infrastructure unit 504 can have a more expansive, more accurate view 514 of the environment encompassing the segment 502. As a result, perception data and prediction data generated by the infrastructure unit 504 and provided to the vehicle 506 can allow the vehicle 506 to increase its understanding of the environment. In addition, perception data and prediction data generated by other (e.g., adjacent) infrastructure units or information from a corresponding central control room can be received by the infrastructure unit 504 and provided to the vehicle 506 to allow the vehicle 506 to have an understanding of relevant navigation information beyond the segment 502. The provision of such data can enhance safety and performance of the vehicle 508 as it navigates along the segment 502 and other segments of the road.

Figure 6:
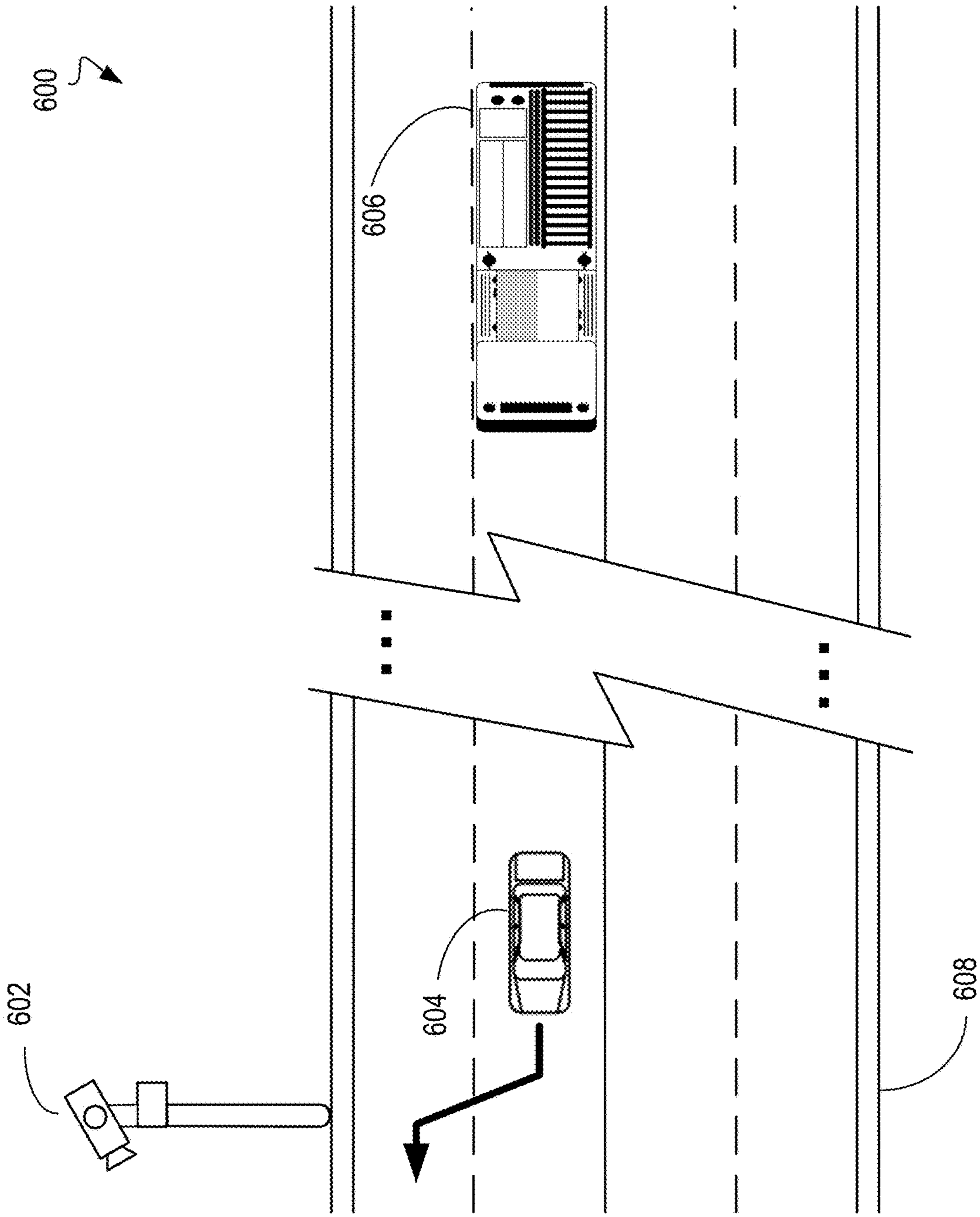
FIG. 6 illustrates a first example of enhanced navigation based on an infrastructure system, according to embodiments of the present technology.

FIG. 6 illustrates a first example of enhanced navigation based on an infrastructure system 600, according to some embodiments of the present technology. FIG. 6 is illustrated for purposes of explanation and is not drawn to scale. The infrastructure system 600 can be implemented for a road having a segment 608 monitored by an associated or dedicated infrastructure unit 602. A vehicle 604 subscribed to the infrastructure system 600 is travelling on the segment 608. An emergency vehicle 606 is beyond the field of view of sensors of the infrastructure unit 602. The infrastructure unit 602 can receive data that the emergency vehicle 606 is far behind the vehicle 604 in a different segment of the road but travelling in the same direction and in the same lane as the vehicle 604. For example, a first infrastructure unit associated with a segment of the road in which the emergency vehicle 606 is currently travelling can determine that the emergency vehicle 606 is operating in an emergency mode. The infrastructure unit 602 and the first infrastructure unit can be separated by numerous infrastructure units. The first infrastructure unit associated with the segment of the road in which the emergency vehicle 606 is currently travelling can relay the data regarding the emergency vehicle 606 to an adjacent second infrastructure unit in the direction of travel of the emergency vehicle 606. The data regarding the emergency vehicle 606 can include, for example, its classification, speed, lane position, and segment in which it is currently located. The second infrastructure unit can notify vehicles in a corresponding segment of the road associated with the second infrastructure unit about the emergency vehicle 606. Likewise, the second infrastructure unit can relay the data regarding the emergency vehicle 606 in the direction of travel of the emergency vehicle 606 to an adjacent third infrastructure unit, which can notify vehicles in a segment of the road associated with the third infrastructure unit about the emergency vehicle 606. The propagation of the data regarding the emergency vehicle 606 can continue from infrastructure unit to infrastructure unit in the direction of travel of the emergency vehicle 606 until the data is received by the infrastructure unit 602. In some instances, the first infrastructure unit can communicate the data regarding the emergency vehicle directly to the infrastructure unit 602. Many variations are possible. The capture and generation of data regarding the emergency vehicle 606 by an infrastructure unit that detects its presence and the propagation or communication of the data to other infrastructure units as described can be repeatedly performed so that the data regarding the emergency vehicle 606 is up to date. In another example, a first infrastructure unit associated with a segment of the road in which the emergency vehicle 606 is currently travelling can communicate the data regarding the emergency vehicle 606 to a central control room, and the central control room can communicate the data to the infrastructure unit 602. The infrastructure unit 602 can communicate the data regarding the emergency vehicle 606 to the vehicle 604. Based on the data regarding the emergency vehicle 606, the vehicle 604 can perform a responsive maneuver, such as an early lane change, so that, when the emergency vehicle 606 approaches the vehicle 604, the emergency vehicle 606 can safely pass without delay or interference.

Figure 7:
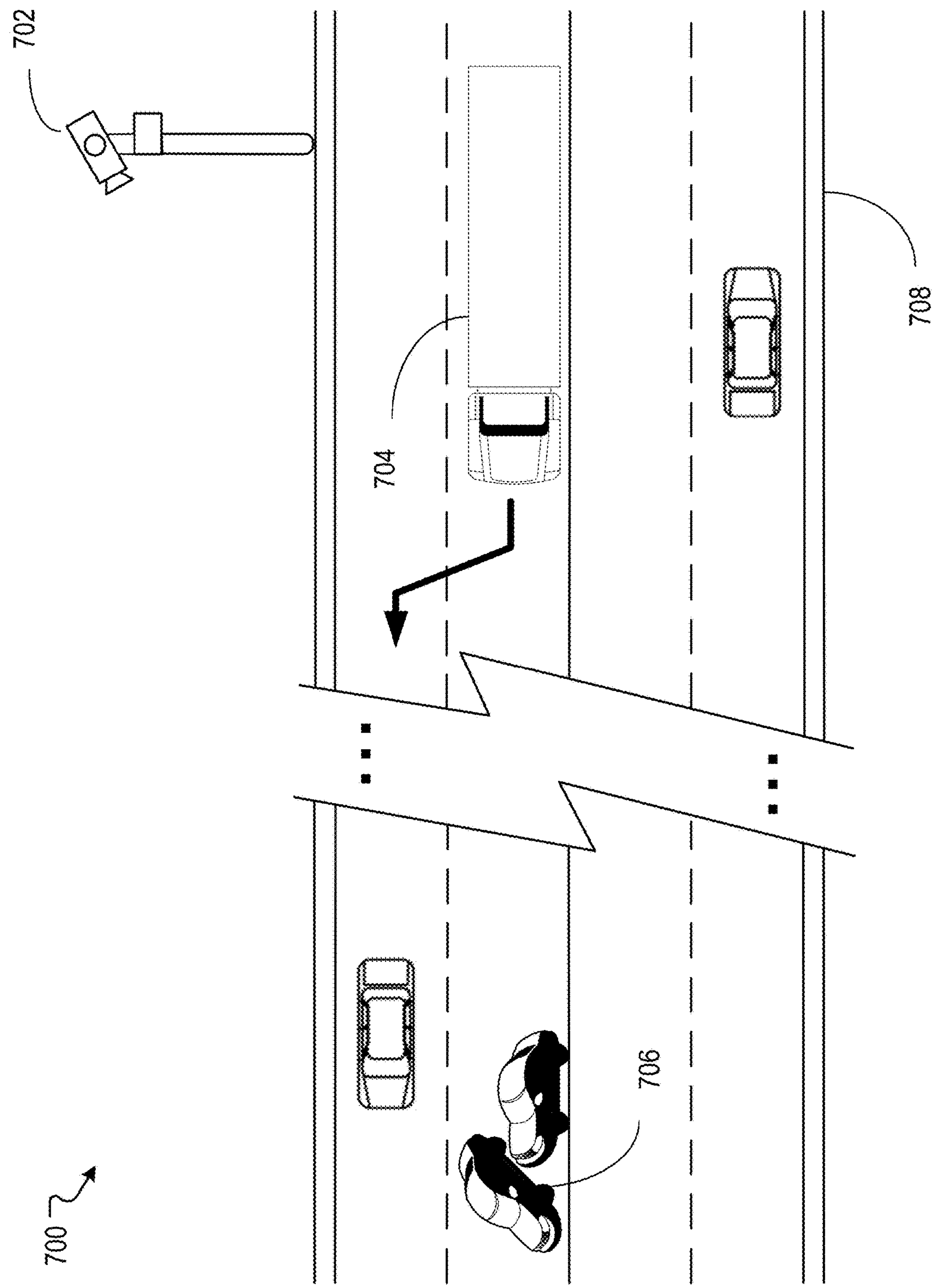
FIG. 7 illustrates a second example of enhanced navigation based on an infrastructure system, according to embodiments of the present technology.

FIG. 7 illustrates a second example of enhanced navigation based on an infrastructure system 700, according to some embodiments of the present technology. FIG. 7 is illustrated for purposes of explanation and is not drawn to scale. The infrastructure system 700 can be implemented for a road having a segment 708 monitored by an associated or dedicated infrastructure unit 702. A vehicle 704 is travelling in the segment 708. The vehicle 704 is subscribed to services provided by the infrastructure system 700. The infrastructure unit 702 can receive data that a road hazard 706, such as a car accident, is in front of the vehicle 704 in a distant segment of the road and is positioned in the same lane as the vehicle 704. Accordingly, the road hazard 706 is beyond the field of view of sensors of the infrastructure unit 702. For example, a first infrastructure unit associated with a segment of the road in which the road hazard 706 has occurred can detect the occurrence of the road hazard 706. The first infrastructure unit and other infrastructure units can repeatedly generate and relay data regarding the road hazard 706, as described, until the data is received by the infrastructure unit 702. Also, the first infrastructure unit associated with a segment of the road in which the road hazard 706 is detected can communicate the data regarding the road hazard 706 to a central control room, and the central control room can communicate the data to the infrastructure unit 702, as described. The infrastructure unit 702 can communicate the data regarding the road hazard 706, such as its classification, lane position, and segment in which the road hazard 706 is located, to the vehicle 704. Based on the data regarding the road hazard 706, the vehicle 704 can perform an early proactive maneuver, such as a lane change, to avoid the road hazard 706. The ability to early on determine the existence of the road hazard 706 in this manner can be critical when the vehicle 704, such as a truck, requires ample time to safely perform the lane change.

Figure 8:
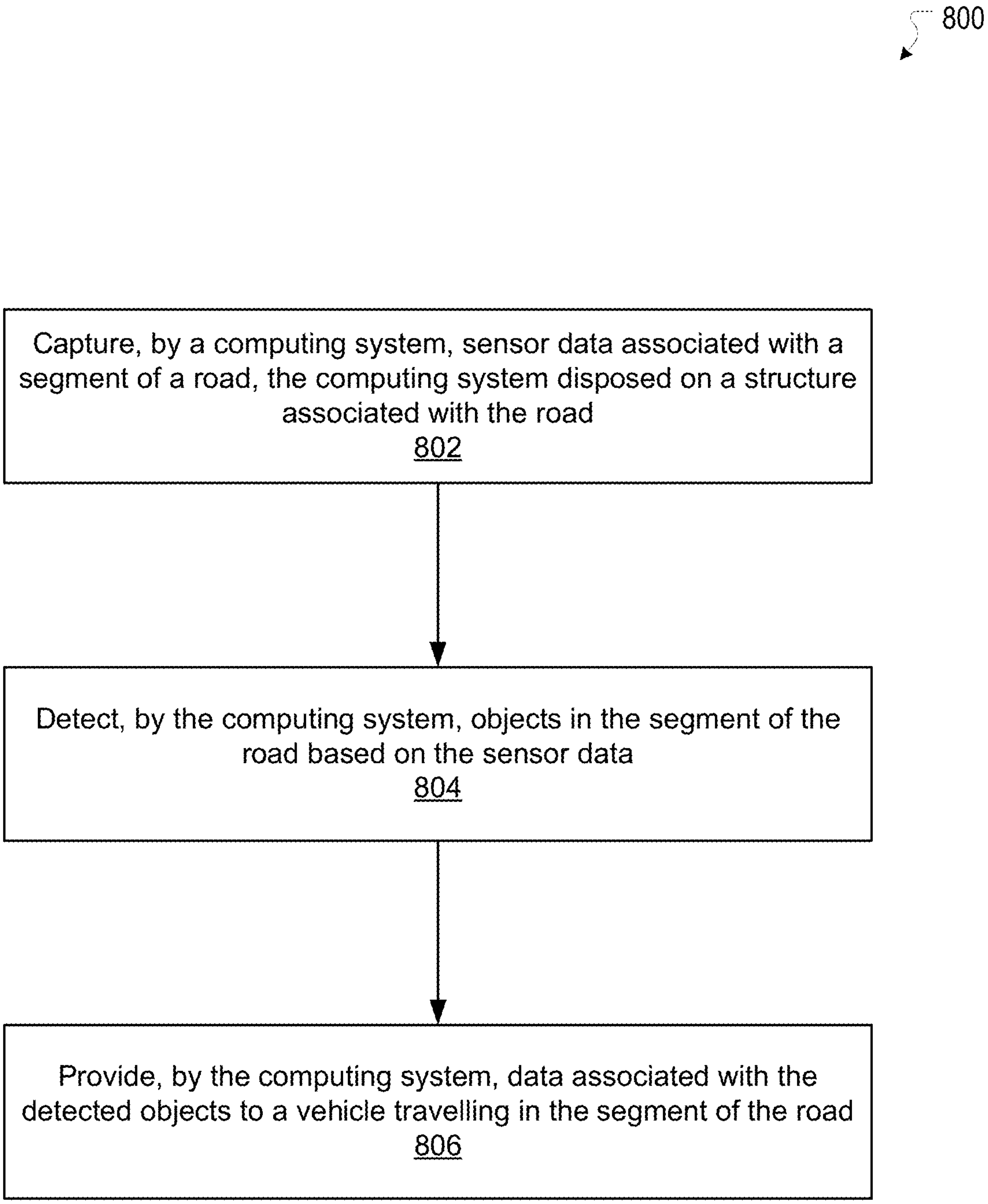
FIG. 8 illustrates an example method, according to embodiments of the present technology.

FIG. 8 illustrates an example method 800, according to embodiments of the present technology. At block 802, the method 800 can capture, by a computing system, sensor data associated with a segment of a road, the computing system disposed on a structure associated with the road. At block 804, the method 800 can detect, by the computing system, objects in the segment of the road based on the sensor data. At block 806, the method 800 can provide, by the computing system, data associated with the detected objects to a vehicle travelling in the segment of the road. Many variations to the example method are possible. It should be appreciated that there can be additional, fewer, or alternative steps performed in similar or alternative orders, or in parallel, within the scope of the various embodiments discussed herein unless otherwise stated.

It is contemplated that there can be many other uses, applications, and/or variations associated with the various embodiments of the present technology. For example, various embodiments of the present technology can learn, improve, and/or be refined over time.

Figure 9:
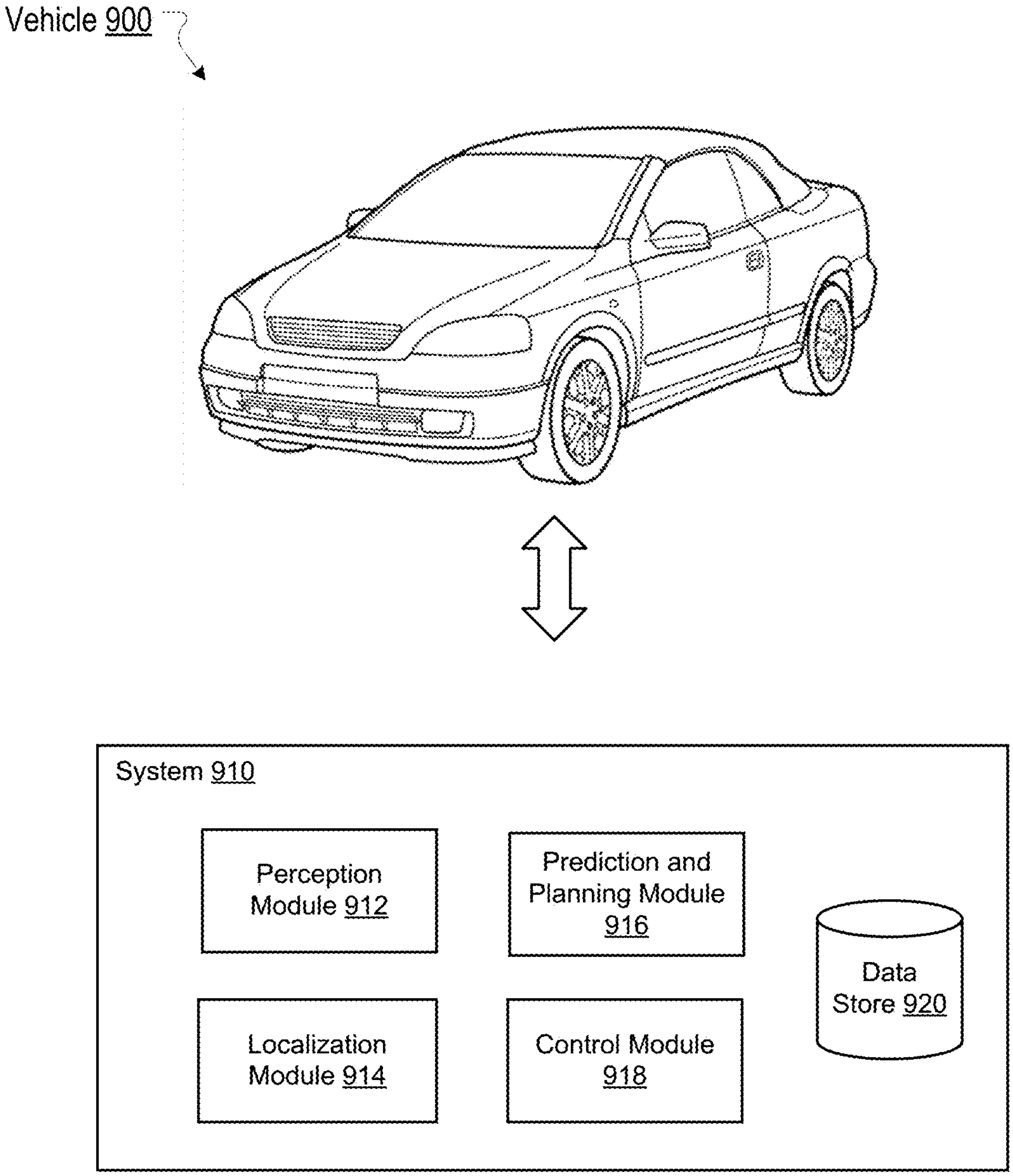
FIG. 9 illustrates an example vehicle, according to embodiments of the present technology.

FIG. 9 illustrates a vehicle 900 including a system 910, according to various embodiments of the present technology. The system 910 can be or include an autonomous, automated or assistance system. The functionality and operation of the present technology, including the system 910, can be implemented in whole or in part by the vehicle 900. The present technology can cause desired control and navigation of the vehicle 900, as described herein. In some embodiments, the vehicle 900 is a passenger vehicle, light commercial vehicle, truck (which can include a trailer), or any other type of motorized transport. The truck can be of any size (e.g., medium truck, heavy truck, very heavy truck, etc.) or weight (e.g., greater than 14,000 pounds, greater than 26,000 pounds, greater than 70,000 pounds, etc.). The system 910 of the vehicle 900 can support and execute various modes of navigation of the vehicle 900. The system 910 can support and execute an autonomous driving mode, a semi-autonomous driving mode, and a driver assisted driving mode of the vehicle 900. The system 910 also can enable a manual driving mode. For operation of the vehicle 900, the system 910 can execute or enable one or more of the autonomous driving mode, the semi-autonomous driving mode, the driver assisted driving mode, and the manual driving mode, and selectively transition among the driving modes based on a variety of factors, such as operating conditions, vehicle capabilities, and driver preferences.

In some embodiments, the system 910 can include, for example, a perception module 912, a localization module 914, a prediction and planning module 916, and a control module 918. The functionality of the perception module 912, the localization module 914, the prediction and planning module 916, and the control module 918 of the system 910 are described in brief for purposes of illustration. As mentioned, the components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the system 910 can be implemented in any suitable combinations.

The perception module 912 can receive and analyze various types of data about an environment in which the vehicle 900 is located. Through analysis of the various types of data, the perception module 912 can perceive the environment of the vehicle 900 and provide the vehicle 900 with critical information so that planning of navigation of the vehicle 900 is safe and effective. For example, the perception module 912 can determine the pose, trajectories, size, shape, and type of obstacles in the environment of the vehicle 900. Various models, such as machine learning models, can be utilized in such determinations.

The various types of data received by the perception module 912 can be any data that is supportive of the functionality and operation of the present technology. For example, the data can be attributes of the vehicle 900, such as location, velocity, acceleration, weight, and height of the vehicle 900. As another example, the data can relate to topographical features in the environment of the vehicle 900, such as traffic lights, road signs, lane markers, landmarks, buildings, structures, trees, curbs, bodies of water, etc. As yet another example, the data can be attributes of dynamic obstacles in the surroundings of the vehicle 900, such as location, velocity, acceleration, size, type, and movement of vehicles, persons, animals, road hazards, etc.

Sensors can be utilized to capture the data. The sensors can include, for example, cameras, radar, LiDAR (light detection and ranging), GPS (global positioning system), IMUs (inertial measurement units), and sonar. The sensors can be appropriately positioned at various locations (e.g., front, back, sides, top, bottom) on or in the vehicle 900 to optimize the collection of data. The data also can be captured by sensors that are not mounted on or in the vehicle 900, such as data captured by another vehicle (e.g., another truck) or by non-vehicular sensors located in the environment of the vehicle 900.

The localization module 914 can determine the pose of the vehicle 900. Pose of the vehicle 900 can be determined in relation to a map of an environment in which the vehicle 900 is travelling. Based on data received by the vehicle 900, the localization module 914 can determine distances and directions of features in the environment of the vehicle 900. The localization module 914 can compare features detected in the data with features in a map (e.g., HD map) to determine the pose of the vehicle 900 in relation to the map. The features in the map can include, for example, traffic lights, crosswalks, road signs, lanes, road connections, stop lines, etc. The localization module 914 can allow the vehicle 900 to determine its location with a high level of precision that supports optimal navigation of the vehicle 900 through the environment.

The prediction and planning module 916 can plan motion of the vehicle 900 from a start location to a destination location. The prediction and planning module 916 can generate a route plan, which reflects high level objectives, such as selection of different roads to travel from the start location to the destination location. The prediction and planning module 916 also can generate a behavioral plan with more local focus. For example, a behavioral plan can relate to various actions, such as changing lanes, merging onto an exit lane, turning left, passing another vehicle, etc. In addition, the prediction and planning module 916 can generate a motion plan for the vehicle 800 that navigates the vehicle 900 in relation to the predicted location and movement of other obstacles so that collisions are avoided. The prediction and planning module 916 can perform its planning operations subject to certain constraints. The constraints can be, for example, to ensure safety, to minimize costs, and to enhance comfort. In some embodiments, an infrastructure system that services a road on which the vehicle 900 is travelling can generate or determine various types of data, such as data relating to objects and events in a segment of the road in which the vehicle 900 is positioned. For example, the data relating to objects can include classification, position, heading, speed, predicted behavior, and other attributes of objects. To enhance safety and navigation of the vehicle 900, the data generated or determined by the infrastructure system can be provided to the vehicle 900 to supplement or replace data generated or determined by the perception module 912, the localization module 914, and the prediction and planning module 916 of the vehicle 900.

Based on output from the prediction and planning module 916, the control module 918 can generate control signals that can be communicated to different parts of the vehicle 900 to implement planned vehicle movement. The control module 918 can provide control signals as commands to actuator subsystems of the vehicle 900 to generate desired movement. The actuator subsystems can perform various functions of the vehicle 900, such as braking, acceleration, steering, signaling, etc.

The system 910 can include a data store 920. The data store 920 can be configured to store and maintain information that supports and enables operation of the vehicle 900 and functionality of the system 910. The information can include, for example, instructions to perform the functionality of the system 910, data captured by sensors, data received from a remote computing system, parameter values reflecting vehicle states, map data, machine learning models, algorithms, vehicle operation rules and constraints, navigation plans, etc.

The system 910 of the vehicle 900 can communicate over a communications network with other computing systems to support navigation of the vehicle 900. The communications network can be any suitable network (e.g., wireless, over the air, wired, etc.) through which data can be transferred between computing systems. Communications over the communications network involving the vehicle 900 can be performed in real time (or near real time) to support navigation of the vehicle 900.

The system 910 can communicate with a remote computing system (e.g., server, server farm, peer computing system) over the communications network. The remote computing system can include an autonomous, automated, or assistance system and perform some or all of the functionality of the system 910. In some embodiments, the functionality of the system 910 can be distributed between the vehicle 900 and the remote computing system to support navigation of the vehicle 900. For example, some functionality of the system 910 can be performed by the remote computing system and other functionality of the system 910 can be performed by the vehicle 900. In some embodiments, a fleet of vehicles including the vehicle 900 can communicate data captured by the fleet to a remote computing system controlled by a provider of fleet management services. The remote computing system in turn can aggregate and process the data captured by the fleet. The processed data can be selectively communicated to the fleet, including vehicle 900, to assist in navigation of the fleet as well as the vehicle 900 in particular. In some embodiments, the system 910 of the vehicle 900 can directly communicate with a remote computing system of another vehicle. For example, data captured by the other vehicle can be provided to the vehicle 900 to support navigation of the vehicle 900, and vice versa. The vehicle 900 and the other vehicle can be owned by the same entity in some instances. In other instances, the vehicle 900 and the other vehicle can be owned by different entities.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. In a further example, the functionalities described with respect to the present technology can be implemented using one or more computing devices or systems that include one or more servers, such as network servers or cloud servers. It should be understood that there can be many variations or other possibilities.

Figure 10:
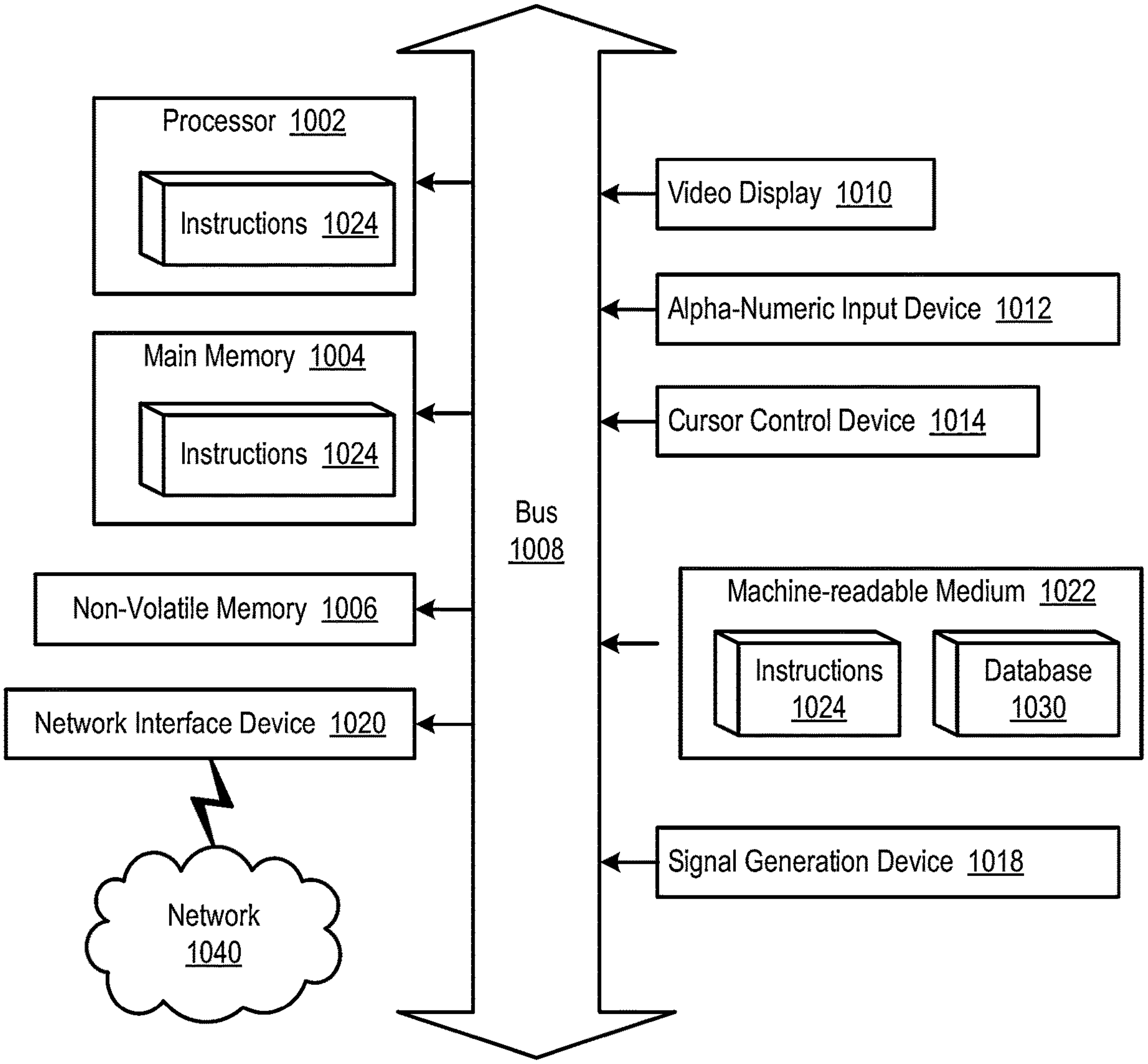
FIG. 10 illustrates an example computing system, according to embodiments of the present technology.

FIG. 10 illustrates an example of a computer system 1000 that may be used to implement one or more of the embodiments of the present technology. The computer system 1000 can be included in a wide variety of local and remote machine and computer system architectures and in a wide variety of network and computing environments that can implement the functionalities of the present technology. The computer system 1000 includes sets of instructions 1024 for causing the computer system 1000 to perform the functionality, features, and operations discussed herein. The computer system 1000 may be connected (e.g., networked) to other machines and/or computer systems. In a networked deployment, the computer system 1000 may operate in the capacity of a server or a client machine in a client-server network environment, or as a peer machine in a peer-to-peer (or distributed) network environment. One or more features or components of the computer system 1000 as described herein can be omitted in various embodiments.

The computer system 1000 includes a processor 1002 (e.g., a central processing unit (CPU), a graphics processing unit (GPU), or both), a main memory 1004, and a nonvolatile memory 1006 (e.g., volatile RAM and non-volatile RAM, respectively), which communicate with each other via a bus 1008. In some embodiments, the computer system 1000 can be a desktop computer, a laptop computer, personal digital assistant (PDA), or mobile phone, for example. In one embodiment, the computer system 1000 also includes a video display 1010, an alphanumeric input device 1012 (e.g., a keyboard), a cursor control device 1014 (e.g., a mouse), a signal generation device 1018 (e.g., a speaker) and a network interface device 1020.

In one embodiment, the video display 1010 includes a touch sensitive screen for user input. In one embodiment, the touch sensitive screen is used instead of a keyboard and mouse. A machine-readable medium 1022 can store one or more sets of instructions 1024 (e.g., software) embodying any one or more of the methodologies, functions, or operations described herein. The instructions 1024 can also reside, completely or at least partially, within the main memory 1004 and/or within the processor 1002 during execution thereof by the computer system 1000. The instructions 1024 can further be transmitted or received over a network 1040 via the network interface device 1020. In some embodiments, the machine-readable medium 1022 also includes a database 1030.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 1006 may also be a random access memory. The non-volatile memory 1006 can be a local device coupled directly to the rest of the components in the computer system 1000. A non-volatile memory that is remote from the system, such as a network storage device coupled to any of the computer systems described herein through a network interface such as a modem or Ethernet interface, can also be used.

While the machine-readable medium 1022 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 600 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually affect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in some embodiments," "in various embodiments," "in an example," "in one implementation," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
capturing, by a computing system, sensor data associated with a segment of a road, and the computing system associated with an infrastructure unit of an infrastructure system, the infrastructure unit dedicated to the segment of the road;
receiving, by the computing system, from a second infrastructure unit of the infrastructure system, data relating to an event occurring in a second segment of the road, wherein the second infrastructure unit selectively relayed the data relating to the event based on a direction of travel associated with the event;
detecting, by the computing system, objects in the segment of the road based on the sensor data;
providing, by the computing system, data associated with the detected objects to a vehicle travelling in the segment of the road, wherein the data associated with the detected objects comprises attributes of the detected objects comprising a classification, position, heading, and speed;
receiving, by the computing system and from a central control room associated with the infrastructure system, second data relating to the event, the second data relating to the event obtained by the central control room from a third party source;
providing the data and the second data relating to the event to the vehicle; and
enabling, by the computing system, the vehicle to perform a maneuver otherwise not authorized when a first onboard system associated with sensing, perception, and prediction of a plurality of onboard systems of the vehicle experiences a fault, wherein the maneuver is travelling to an interim safe location instead of immediately stopping.

2. The computer-implemented method of claim 1, wherein the infrastructure system provides services to vehicles subscribed to the services and travelling on the road.

3. The computer-implemented method of claim 1, wherein the direction of travel corresponds to movement of a vehicle associated with the event.

4. The computer-implemented method of claim 1, wherein the computing system is associated with an infrastructure unit comprising a sensor system and a computation system, the sensor system comprising at least one of a camera, radar, or LiDAR to capture the sensor data, and the computation system to detect the objects based on the sensor data.

5. The computer-implemented method of claim 1, wherein the data associated with the detected objects comprises attributes of the detected objects further comprising optional predicted behavior.

6. The computer-implemented method of claim 1, wherein the data associated with the detected objects is at least in part redundant to data generated by the first onboard system of the vehicle.

7. The computer-implemented method of claim 1, wherein an expansion of an operational design domain (ODD) of the vehicle is based on the data associated with the detected objects.

8. The computer-implemented method of claim 1, further comprising:
receiving, from the second infrastructure unit, data relating to the event occurring in the second segment of the road, the second infrastructure unit i) included in a plurality of infrastructure units of the infrastructure system including the infrastructure unit and ii) dedicated to the second segment of the road; and
providing the data relating to the event to the vehicle.

9. The computer-implemented method of claim 1, wherein the computing system is associated with an infrastructure unit of an infrastructure system, the infrastructure unit comprising one or more types of sensors not present on the vehicle.

10. A system comprising:
at least one processor; and
a memory storing instructions that, when executed by the at least one processor, cause the system to perform operations comprising:
capturing sensor data associated with a segment of a road, the system associated with an infrastructure unit of an infrastructure system, the infrastructure unit dedicated to the segment of the road;
receiving from a second infrastructure unit of the infrastructure system, data relating to an event occurring in a second segment of the road, wherein the second infrastructure unit selectively relayed the data relating to the event based on a direction of travel associated with the event;
detecting objects in the segment of the road based on the sensor data;
providing data associated with the detected objects to a vehicle travelling in the segment of the road, wherein the data associated with the detected objects comprises attributes of the detected objects comprising a classification, position, heading, and speed;
receiving, from a central control room associated with the infrastructure system, second data relating to the event, the second data relating to the event obtained by the central control room from a third party source;
providing the data and the second data relating to the event to the vehicle; and
enabling the vehicle to perform a maneuver otherwise not authorized when a first onboard system associated with sensing, perception, and prediction of a plurality of onboard systems of the vehicle experiences a fault, wherein the maneuver is travelling to an interim safe location instead of immediately stopping.

11. The system of claim 10, wherein the infrastructure system provides services to vehicles subscribed to the services and travelling on the road.

12. The system of claim 10, wherein the direction of travel corresponds to movement of a vehicle associated with the event.

13. The system of claim 10, wherein the system is associated with an infrastructure unit comprising a sensor system and a computation system, the sensor system comprising at least one of a camera, radar, or LiDAR to capture the sensor data, and the computation system to detect the objects based on the sensor data.

14. The system of claim 10, wherein the data associated with the detected objects comprises attributes of the detected objects further comprising optional predicted behavior.

15. The system of claim 10, wherein the data associated with the detected objects is at least in part redundant to data generated by the first onboard system of the vehicle.

16. A non-transitory computer-readable storage medium including instructions that, when executed by at least one processor of a computing system, cause the computing system to perform operations comprising:

capturing sensor data associated with a segment of a road, the computing system associated with an infrastructure unit of an infrastructure system, the infrastructure unit dedicated to the segment of the road;

receiving from a second infrastructure unit of the infrastructure system, data relating to an event occurring in a second segment of the road, wherein the second infrastructure unit selectively relayed the data relating to the event based on a direction of travel associated with the event;

detecting objects in the segment of the road based on the sensor data;

providing data associated with the detected objects to a vehicle travelling in the segment of the road, wherein the data associated with the detected objects comprises attributes of the detected objects comprising a classification, position, heading, and speed;

receiving, from a central control room associated with the infrastructure system, second data relating to the event, the second data relating to the event obtained by the central control room from a third party source;

providing the data and the second data relating to the event to the vehicle; and enabling the vehicle to perform a maneuver otherwise not authorized when a first onboard system associated with sensing, perception, and prediction of a plurality of onboard systems of the vehicle experiences a fault, wherein the maneuver is travelling to an interim safe location instead of immediately stopping.

17. The non-transitory computer-readable storage medium of claim 16, wherein the infrastructure system provides services to vehicles subscribed to the services and travelling on the road.

18. The non-transitory computer-readable storage medium of claim 16, wherein the direction of travel corresponds to movement of a vehicle associated with the event.

19. The non-transitory computer-readable storage medium of claim 16, wherein the computing system is associated with an infrastructure unit comprising a sensor system and a computation system, the sensor system comprising at least one of a camera, radar, or LiDAR to capture the sensor data, and the computation system to detect the objects based on the sensor data.

20. The non-transitory computer-readable storage medium of claim 16, wherein the data associated with the detected objects comprises attributes of the detected objects further comprising optional predicted behavior.

* * * * *